United States Patent
Seidel et al.

(10) Patent No.: US 9,369,655 B2
(45) Date of Patent: Jun. 14, 2016

(54) REMOTE CONTROL DEVICE TO DISPLAY ADVERTISEMENTS

(75) Inventors: Joseph J. Seidel, Menlo Park, CA (US); Nadav M. Neufeld, Sunnyvale, CA (US); Pradhan S. Rao, Sunnyvale, CA (US)

(73) Assignee: MICROSOFT CORPORATION, Redmond, WA (US)

( * ) Notice: Subject to any disclaimer, the term of this patent is extended or adjusted under 35 U.S.C. 154(b) by 1600 days.

(21) Appl. No.: 12/060,831

(22) Filed: Apr. 1, 2008

(65) Prior Publication Data

US 2009/0248515 A1    Oct. 1, 2009

(51) Int. Cl.
| | |
|---|---|
| *H04N 5/44* | (2011.01) |
| *G06Q 30/02* | (2012.01) |
| *G06Q 30/06* | (2012.01) |
| *H04N 21/2547* | (2011.01) |
| *H04N 21/422* | (2011.01) |
| *H04N 21/81* | (2011.01) |

(52) U.S. Cl.
CPC ............. *H04N 5/4403* (2013.01); *G06Q 30/02* (2013.01); *G06Q 30/0255* (2013.01); *G06Q 30/0601* (2013.01); *H04N 21/2547* (2013.01); *H04N 21/42207* (2013.01); *H04N 21/42209* (2013.01); *H04N 21/42224* (2013.01); *H04N 21/42226* (2013.01); *H04N 21/812* (2013.01); *H04N 2005/441* (2013.01)

(58) Field of Classification Search
USPC ................................ 705/14.1–14.73; 348/734
See application file for complete search history.

(56) References Cited

U.S. PATENT DOCUMENTS

| | | | | |
|---|---|---|---|---|
| 5,410,326 | A * | 4/1995 | Goldstein | 348/734 |
| 6,130,726 | A * | 10/2000 | Darbee et al. | 348/734 |
| 6,278,499 | B1 * | 8/2001 | Darbee et al. | 348/734 |
| 6,741,684 | B2 | 5/2004 | Kaars | |
| 7,230,563 | B2 | 6/2007 | Vidal | |
| 7,500,192 | B2 * | 3/2009 | Mastronardi | 715/727 |
| 2003/0034957 | A1 | 2/2003 | Dubil et al. | |
| 2004/0158854 | A1 | 8/2004 | Nagasawa et al. | |
| 2005/0055640 | A1 * | 3/2005 | Alten | 715/719 |
| 2005/0110909 | A1 | 5/2005 | Staunton et al. | |
| 2007/0080845 | A1 | 4/2007 | Amand | |
| 2007/0204308 | A1 * | 8/2007 | Nicholas et al. | 725/86 |
| 2007/0236613 | A1 | 10/2007 | Foss | |
| 2008/0098426 | A1 * | 4/2008 | Candelore | 725/38 |
| 2009/0132326 | A1 * | 5/2009 | Alkove et al. | 705/9 |

OTHER PUBLICATIONS

"Logitech Harmony 1000—Touch Screen Universal Remote Control", 1996-2007, Amazon.com, Inc., pp. 7.

(Continued)

*Primary Examiner* — Greg Pollock
(74) *Attorney, Agent, or Firm* — Aaron Chatterjee; Sandy Swain; Micky Minhas

(57) ABSTRACT

Techniques to display advertisements on a remote control device are described. In an implementation, a remote control device includes a display device and one or more modules. The one or more modules are configured to initiate one or more control functions related to control of an output of content by a client. The one or more modules are also configured to detect manual interaction and initiate a first mode to display an advertisement on the display device when the manual interaction has not been detected. A second mode is initiated by the one or more modules to display one or more representations of the one or more control functions when the manual interaction is detected.

16 Claims, 5 Drawing Sheets

(56) References Cited

OTHER PUBLICATIONS

Stone, "A TV Remote Control That Displays Only Internet video", Jul. 15, 2007, International Herald Tribune, pp. 2.

"Touch Screen Remote Controls & Touch Panel Remote Controls", 2005, Universal Electronics Inc., pp. 2.

"Intelligent Remote Control with LCD Touchscreen Display", Philips Consumer Electronics, 2000, pp. 2.

* cited by examiner

REMOTE CONTROL DEVICE TO DISPLAY ADVERTISEMENTS

BACKGROUND

Remote control devices were developed to expand an ability of users to control content interaction by associated clients. For example, a client may be configured as a television to consume traditional television programming and a traditional remote control device may be communicatively coupled to the television to initiate one or more control functions of the television. Therefore, a user may press buttons on the traditionally configured remote control device to increase or decrease volume of the television, change channels, select different sources for content, and so on.

Traditional remote control devices, however, were static and inflexible and therefore were traditionally limited to interaction using specific control functions. Continuing with the previous example, although the user could interact with the remote control device to control basic operation of the client, actual interaction with the content was limited to the client.

SUMMARY

Techniques to display advertisements on a remote control device are described. In an implementation, a remote control device includes a display device and one or more modules. The one or more modules are configured to initiate one or more control functions related to control of an output of content by a client. The one or more modules are also configured to detect manual interaction and initiate a first mode to display an advertisement on the display device when the manual interaction has not been detected. A second mode is initiated by the one or more modules to display one or more representations of the one or more control functions when the manual interaction is detected.

In another implementation, a remote control device has functionality to initiate one or more control functions to control an output of content on a client. A determination is made that manual interaction with the remote control device has not been detected for a predetermined amount of time. Responsive to the determination, an advertisement is displayed on the remote control device.

In a further implementation, a service is provided to stream advertisements to be displayed on a client and advertisements to be displayed on a remote control device. The remote control device is configured to initiate one or more control functions related to output of content on the client. Revenue is collected from one or more advertisers to stream at least one of the advertisements to be displayed on the client and at least one of the advertisements to be displayed on the remote control device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques to display advertisements using a remote control device are described. In an implementation a remote control device includes a display device that is used to output advertisements. For example, the remote control device may be configured as a "glassy brick" that includes a touch screen that covers approximately half (e.g., more than forty percent) of an outer surface of the remote control device. The remote control device may also include functionality to detect manual interaction with the remote control device, such as when the remote control device is moved (e.g., "picked up"), when a button is pressed, and so on.

When manual interaction has not been detected for a predetermined amount of time (e.g., ten seconds), the remote control device may display an advertisement. When manual interaction is detected, the remote control device may display representations of one or more control functions, e.g., "volume up", "volume down" and so on. In this way, the remote control device may be leveraged to provide advertisements without interrupting a user's consumption of content on a client (e.g., a television) and/or interaction with the remote control device itself (e.g., to initiate control functions using the remote control device).

A variety of different advertisements may be output by the client. For instance, advertisements on the remote control device may be coordinated with advertisements or other content output on the client. An advertisement displayed on the remote control device, for example, may be a logo of a brand that corresponds to an advertisement output by the client. In another example, the advertisement is selected based on content being output by the client (e.g., by "knowing" what is being output by the client), such as to coordinate a golf club advertisement output on the remote control device with a golf television program. A variety of other examples and instances are also contemplated, such as to display an advertisements that relates to content that is currently available via a channel that is different than a channel currently being used by the client, further discussion of which may be found in relation to the following figures.

In the following discussion, an example environment is first described that is operable to perform techniques to display advertisements on a remote control device. Example procedures are then described that may be employed in the example environment, as well as in other environments. Although display of advertisements on a remote control device is described in the following discussion in relation to a television environment, it should be readily apparent that a wide variety of contexts may leverage these techniques without departing from the spirit and scope thereof, such as through use of wireless phones that are usable to control other clients such as vending machines and so on.

Example Environment

Figure 1:
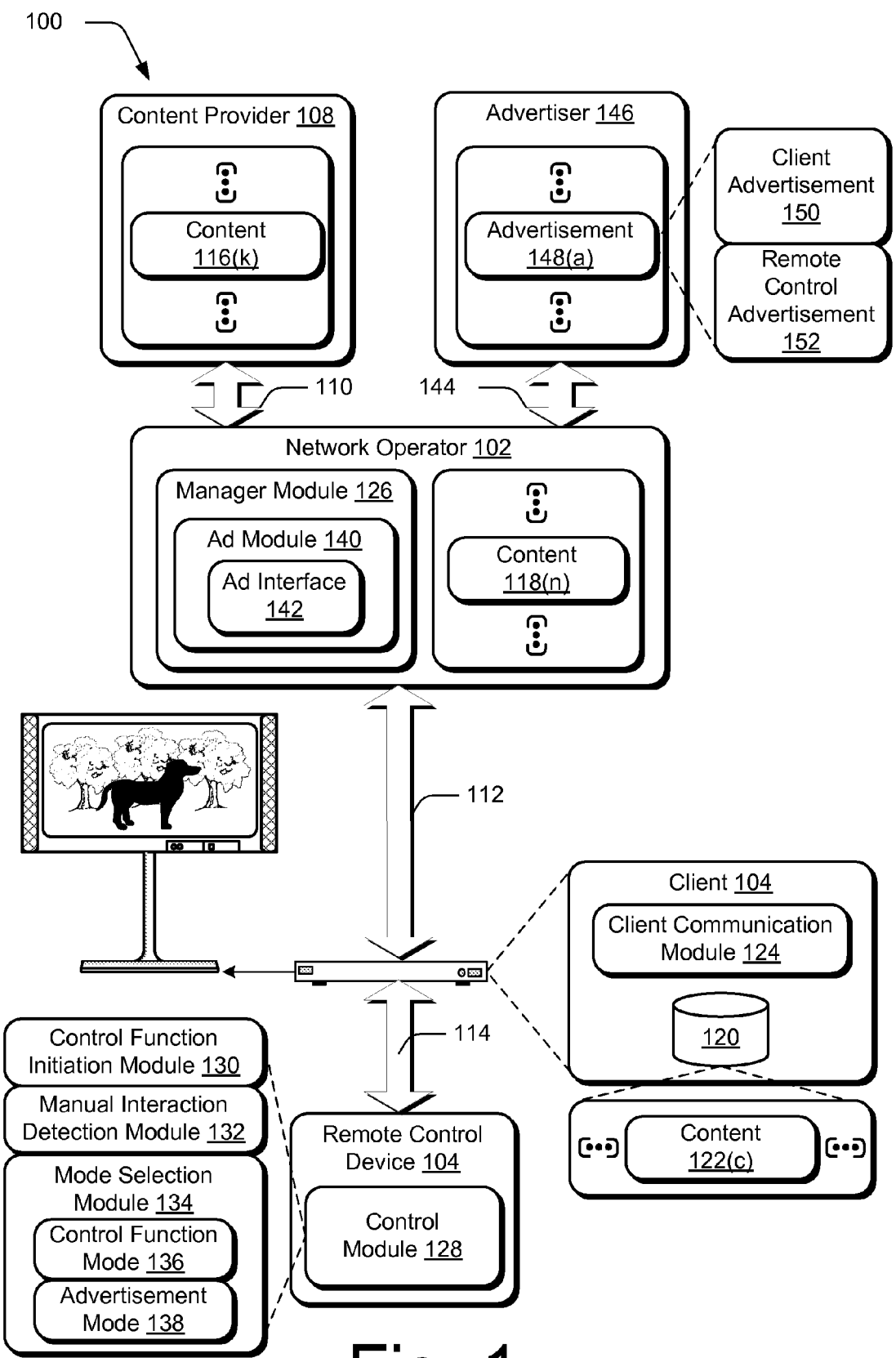
FIG. 1 is an illustration of an environment in an example implementation that is operable to employ techniques to display advertisements on a remote control device.

FIG. 1 is an illustration of an environment 100 in an example implementation that is operable to employ techniques to display advertisements on a remote control device. The illustrated environment 100 includes a network operator 102 (e.g., a "head end"), a client 104, a remote control device 106 and a content provider 108 that are communicatively coupled, one to another, via network connections 110, 112, 114. In the following discussion, the network operator 102, the client 104, the remote control device 106 and the content provider 108 may be representative of one or more entities, and therefore by convention reference may be made to a single entity (e.g., the client 104) or multiple entities (e.g., the clients 104, the plurality of clients 104, and so on). Additionally, although a plurality of network connections 110-114 are shown separately, the network connections 110-114 may be representative of network connections achieved using a single network or multiple networks, e.g., network connections 110, 112 may be implemented via the internet and network connection 114 may be implemented via a local network connection, such as via infra red, a radio frequency connection, and so on. In another example, network connection 114 may also be implemented via the internet.

The client 104 may be configured in a variety of ways. For example, the client 104 may be configured as a computer that is capable of communicating over the network connections 112, 114, such as a television, a mobile station, an entertainment appliance (e.g., a game console), a set-top box communicatively coupled to a display device as illustrated, a wireless phone, and so forth. Thus, the client 104 may range from a full resource device with substantial memory and processor resources (e.g., television-enabled personal computers, television recorders equipped with hard disk) to a low-resource device with limited memory and/or processing resources (e.g., traditional set-top boxes).

Communication of content to the client 104 may be performed in a variety of ways. For example, the client 104 may be communicatively coupled to the content provider 108 (which may be representative of one or more content providers) using a packet-switched network, e.g., the Internet. Accordingly, the client 104 may receive one or more items of content 116(k), where "k" can be any integer from 1 to "K" directly from the content provider 108, e.g., via one or more websites. The content 116(k) may include a variety of data, such as television programming, video-on-demand (VOD) files, one or more results of remote application processing, and so on. A variety of other examples are also contemplated, such as by using an indirect distribution example in which the content 116(k) is communicated over the network connection 110 to the network operator 102.

Content 116(k), as illustrated in the example environment 100 of FIG. 1, is communicated via the network connection 110 is received by the network operator 102 and may be stored as one or more items of content 118(n), where "n" can be any integer from "1" to "N". The content 118(n) may be the same as or different from the content 116(k) received from the content provider 108. The content 118(n), for instance, may include additional data for broadcast to the client 104. For example, the content 118(n) may include electronic program guide (EPG) data from an EPG database for broadcast to the client 104 utilizing a carousel file system and an out-of-band (OOB) channel. Distribution from the network operator 102 to the client 104 over network connection 112 may be accommodated in a number of ways, including cable, radio frequency (RF), microwave, digital subscriber line (DSL), and satellite.

The client 104, as previously stated, may be configured in a variety of ways to receive the content 118(n) over the network connection 114. The client 104 typically includes hardware and software to transport and decrypt content 118(n) received from the network operator 102 for output to and rendering by the illustrated display device. Although a display device is shown, a variety of other output devices are also contemplated, such as speakers. Although the display device is illustrated separately from the client 104, it should be readily apparent that the client 104 may also include the display device as an integral part thereof.

The client 104 may also include digital video recorder (DVR) functionality. For instance, the client 104 may include a storage device 120 to record content 118(n) as content 122(c) (where "c" can be any integer from one to "C") received via the network connection 112 for output to and rendering by the display device. The storage device 120 may be configured in a variety of ways, such as a hard disk drive, a removable computer-readable medium (e.g., a writable digital video disc), and so on. Thus, content 122(c) that is stored in the storage device 120 of the client 104 may be copies of the content 118(n) that was streamed from the network operator 102. Additionally, content 122(c) may be obtained from a variety of other sources, such as from a computer-readable medium that is accessed by the client 104, and so on. For example, content 122(c) may be stored on a digital video disc (DVD) when the client 104 is configured to include DVD functionality.

The client 104 includes a client communication module 124 that is representative of functionality of the client 104 to control content interaction on the client 104, such as through the use of one or more "control functions". The control functions may include a variety of functions to control output of content, such as to control volume, change channels, select different inputs, configure surround sound, and so on. The control functions may also provide non-linear playback of the content 122(c) (i.e., time shift the playback of the content 122(c)) such as pause, rewind, fast forward, slow motion playback, and the like. For example, during a pause, the client 104 may continue to record the content 118(n) in the storage device 120 as content 122(c). The client 104, through execution of the client communication module 124, may then playback the content 122(c) from the storage device 120, starting at the point in time the content 122(c) was paused, while continuing to record the currently-broadcast content 118(n) in the storage device 120 from the network operator 102.

When playback of the content 122(c) is requested, the client communication module 124 retrieves the content 122(c). The client communication module 124 may also restore the content 122(c) to the original encoded format as received from the content provider 108. For example, when the content 122(c) is recorded on the storage device 120, the content 122(c) may be compressed. Therefore, when the client communication module 124 retrieves the content 122(c), the content 122(c) is decompressed for rendering by the display device.

The network operator 102 is illustrated as including a manager module 126. The manager module 126 is representative of functionality to configure content 118(n) for output (e.g., streaming) over the network connection 112 to the client 104.

The manager module 126, for instance, may configure content 116(*k*) received from the content provider 108 to be suitable for transmission over the network connection 112, such as to "packetize" the content for distribution over the Internet, configuration for a particular broadcast channel, and so on.

Thus, in the environment 100 of FIG. 1, the content provider 108 may broadcast the content 116(*k*) over a network connection 110 to a multiplicity of network operators, an example of which is illustrated as network operator 102. The network operator 102 may then stream the content 118(*n*) over a network connection 112 to a multitude of clients, an example of which is illustrated as client 104. The client 104 may then store the content 118(*n*) in the storage device 120 as content 122(*c*), such as when the client 104 is configured to include digital video recorder (DVR) functionality, and/or output the content 118(*n*) directly.

The remote control device 106 is illustrated as including a control module 128 that is representative of functionality to control operation of the remote control device 106. The control module 128, for instance, is illustrated as including a control function initiation module 130 that is representative of functionality to initiate control functions of the client 104. For example, the control function initiation module 130 may be configured to receive inputs related to selection of representations of control functions, such as a selection of a "volume up" representation on the remote control device 106 using a button. Data representing this selection may then be communicated via network connection 114 to the client 104 that causes the client 104 (e.g., the client communication module 124) to increase the volume. A variety of other control functions may also be initiated by the control function module 128 as previously described.

The control module 128 is also illustrated as including a manual interaction detection module 132 that is representative of functionality to detect manual interaction. The manual interaction detection module 132, for instance, may incorporate one or more sensors that detect when the remote control device 106 is moved, such as through an accelerometer, inertia detection sensor, position-determining device, and so on. In another instance, the manual interaction detection module 132 may detect manual interaction by a user pressing a button, providing a speech input, and so on.

The control module 128 is further illustrated as including a mode selection module 134 that is representative of functionality to select a particular functional mode to operate the remote control device 106. For example, the mode selection module 134 may select a control function mode 136 to display representations of control functions to control output of content by the client 104, an example of which may be found in relation to the following figure.

Figure 2:
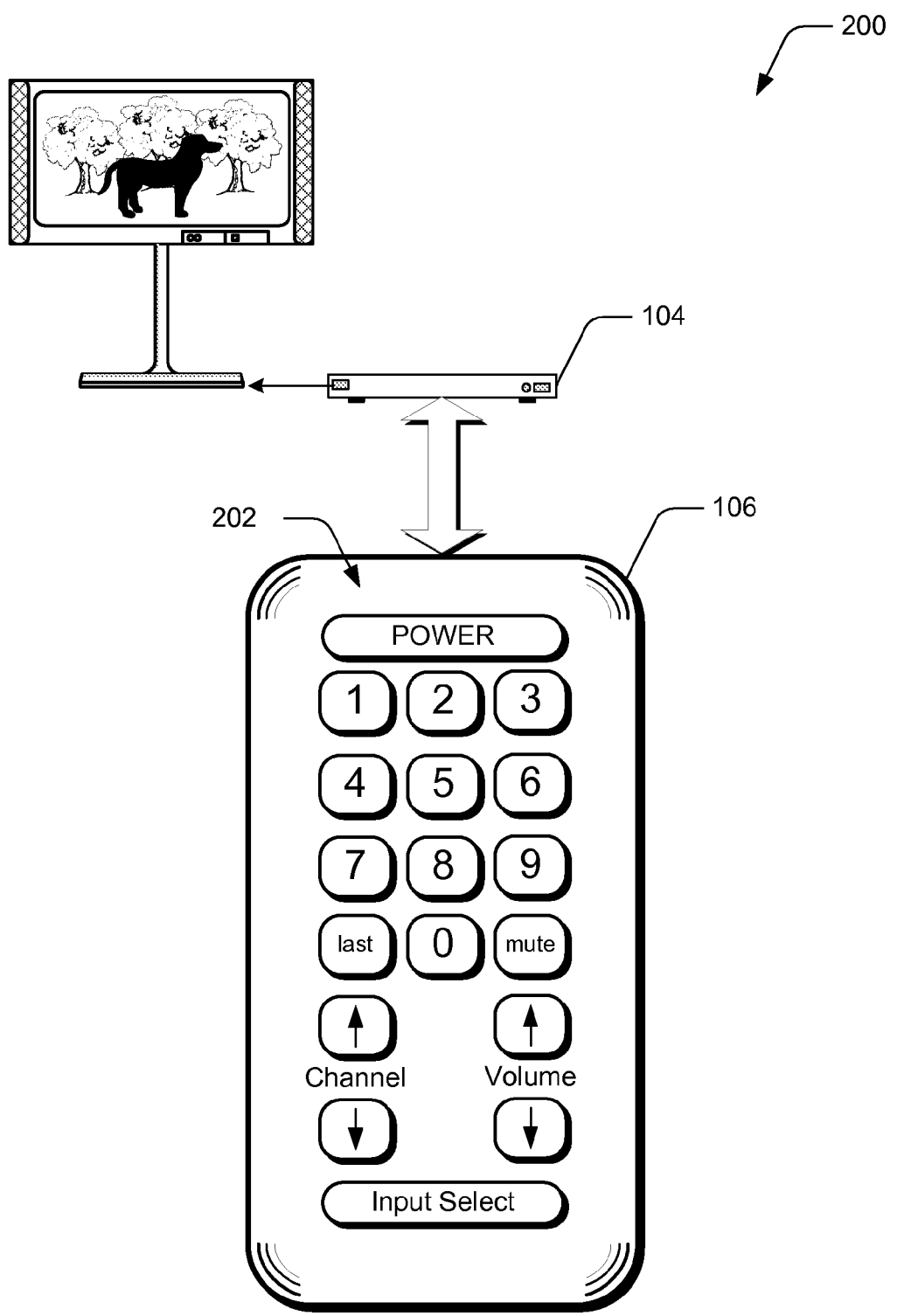
FIG. 2 is an illustration of an exemplary system showing the remote control device of FIG. 1 in greater detail as displaying representations of one or more control functions of a client of FIG. 1 that may be initiated through selection on the remote control device when in a control function mode.

FIG. 2 depicts an exemplary system 200 showing the remote control device 106 in greater detail as displaying representations 202 of one or more control functions of the client 104 that may be initiated through selection on the remote control device 106. The illustrated remote control device 106 includes a display device (e.g., a touch screen) that consumes approximately half of an outer surface of the remote control device thereby giving the remote control device an appearance of a "glass brick".

In another implementation, the display device of the remote control device 104 covers at least forty percent of the outer surface of the remote control device 104. In a further implementation, the display device consumes, approximately, an outer surface of the remote control device 106 that is viewable by a user when placed on a surface (e.g., a top of a table) and/or grasped in a hand of the user, e.g., the illustrated outer surface of the remote control device 106 in FIG. 2. A variety of other implementations are also contemplated, such as implementations in which the display device of the remote control device 106 includes more or less than the previously described amounts of the outer surface of the remote control device 106.

The display device of the remote control device, for instance, may be implemented such that representations of control functions and other data are reconfigurable and therefore may be displayed on the remote control device 106 in a variety of ways. For example, different portions of the display device of the remote control device 106 may be configured to detect contact and/or proximity of an object to the display device such that different portions of the display device are selectable. A variety of different techniques may be used to detect selection, such as through resistive techniques, surface acoustic waves, capacitive, infrared, use of strain gauges, optical imaging, dispersive signal technology, acoustic pulse recognition, frustrated total internal reflection, and so on. Using these techniques, a variety of data may be displayed on the display device of the remote control device. Further, interaction with the displayed data may be performed in a variety of ways.

By selecting one or more of the representations 202 using the display device, for instance, a user may supply an input to initiate the represented control function by the client 104. As illustrated by the remote control device 106 of FIG. 2, for instance, a user may select a "power" representation, one or more numbers to select a channel, "mute", "last", "channel up", "channel down", "volume up", "volume down" and "input select". Thus, when the illustrated remote control device 106 is in the control function mode, the remote control device 106 may communicate with the client 104 to control output of content by the client 104.

Figure 3:
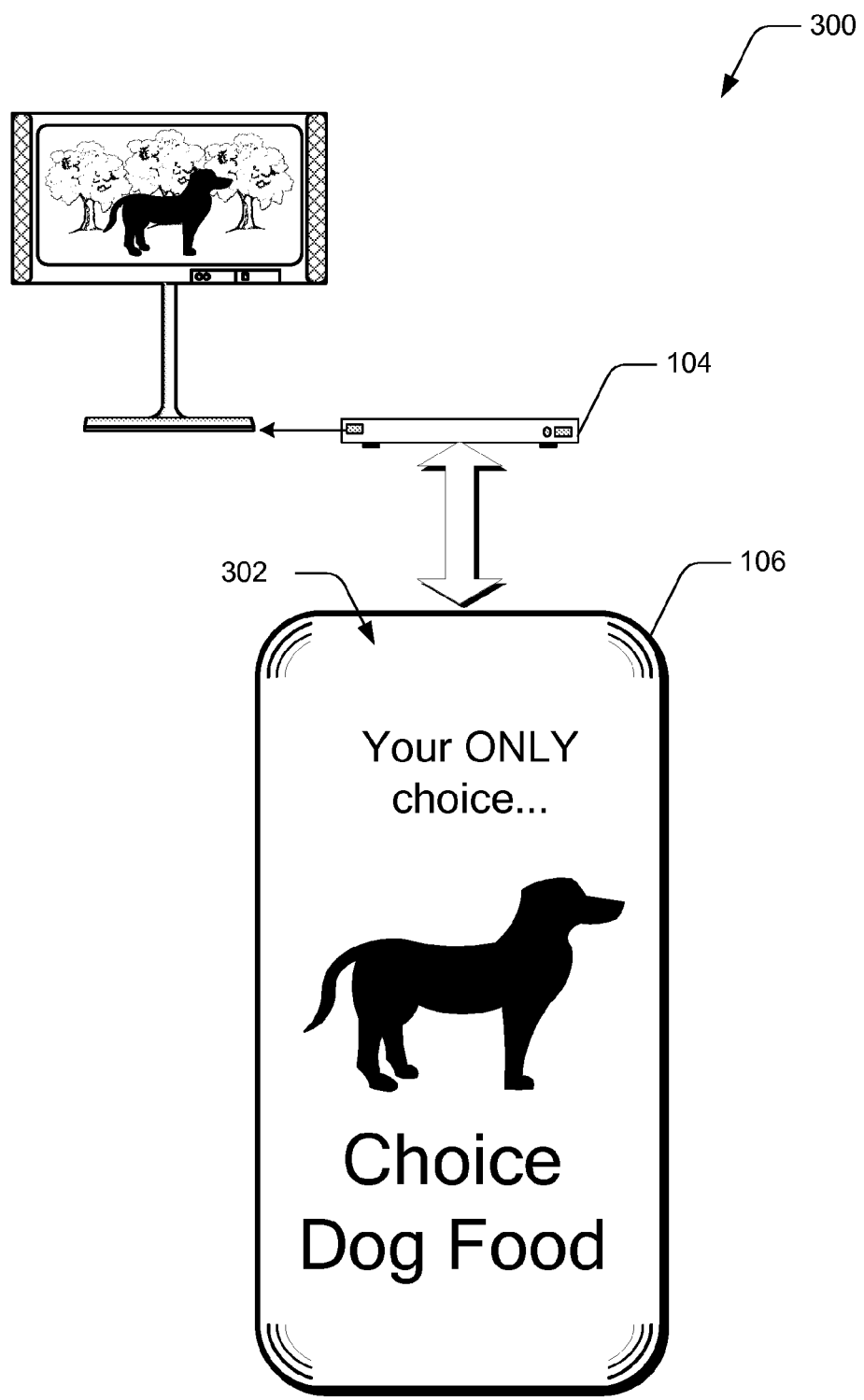
FIG. 3 is an illustration of an exemplary system showing the remote control device of FIG. 2 as displaying an advertisement in an advertisement mode.

FIG. 3 depicts an exemplary system 300 showing the remote control device 106 of FIG. 2 as displaying an advertisement 302. The advertisement 302 of FIG. 3 as displayed by the remote control device 106 consumes an approximate available display area of the display device of the remote control device, although other implementations are also contemplated.

In the illustrated system 300, the remote control device 106 is in an "advertisement mode" such that the advertisement 302 replaces at least one of the representations 202 of the control functions of the control function mode of FIG. 2. This replacement may be performed in response to a wide variety of conditions, such as when manual interaction with the remote control device 106 has not been detected for a predetermined amount of time by the manual interaction detection module 132 of FIG. 1, in response to an input provided by a user and/or the client 104, and so on. Further, although replacement of the representations 202 with the advertisement 302 has been described, a variety of other implementations are also contemplated, such as through display in dedicated areas of the display device of the remote control device 106 of the representations 202 and the advertisement 302, respectively.

The advertisement 302 may be provided to the remote control device for output in a variety of ways. Returning now to FIG. 1, for instance, the manager module 126 of the network operator 102 is illustrated as including an ad module 140 that is representative of functionality to provide a service to stream advertisements to be displayed on the client 104 and/or advertisements to be displayed on the remote control device 106.

The service, for instance, may be accessible via an ad interface 142 over a network connection 144 by an advertiser 146, which as before may be representative of one or more advertisers that access the ad interface 142 over a network. The advertiser 146, for instance, may interact with the ad interface 142 to determine which opportunities are available to include one or more advertisements 148(a) (where "a" may be an integer from one to "A") and/or how the opportunities are available, e.g., for a particular price, by auction, and so on.

For example, the advertiser 146 may interact with the ad interface 142 to purchase an opportunity to link the advertisement 148(a) with particular content 118(n) when output by the client 104. As shown in FIG. 3, for instance, an advertisement for "Choice Dog Food" may be displayed on the remote control 106 when the client 104 outputs the television program "Old Yeller". Thus, in this instance the advertisement 302 is coordinated with an output of content that is a television program.

Likewise, a display of an advertisement on the remote control device 106 may also be coordinated with an output of content by the client 104 that is also an advertisement. For example, the advertisement 148(a) may be a static image of a brand that corresponds to a brand of a product or service output in an advertisement by the client 104.

Output of the advertisements 148(a) may also be performed such that it is not coordinated with specific content. For example, advertisements 148(a) may be streamed to the remote control device 106 for output at a particular time regardless of "what is on". In another example, advertisements 148(a) may be stored on the remote control device 106 and output for a particular amount of time, e.g., the advertiser 146 pays for a particular amount of time to output the advertisement 148(a) on the remote control device 106, and so on.

Additionally, the ad module 140 may provide different pricing for different advertising opportunities. Continuing with the previous example in which advertisements 148(a) are coordinated with content, a particular price for output of an advertisement on the remote control device 106 may be charged for output with a corresponding advertisement on the client 104. For a "last" opportunity during a commercial "break", an additional charge may be offered to continue display of the advertisement on the remote control device 106 while the client 104 displays non-advertising content, e.g., a television program. A variety of other examples are also contemplated, further discussion of which may be found in relation to FIG. 5.

The advertisements 148(a) may provided in a variety of ways. For example, advertisements 148(a) streamed to the client 104 and the remote control device 106 may be the same and configured by respective devices automatically for output. In another example, the advertisements 148(a) may be configured specifically for the respective devices. For example, the advertiser 146 may configure a client advertisement 150 for output by the client 104 and a remote control advertisement 152 for output by the remote control device 106. The remote control advertisement 152 may be provided in a separate data stream that is sent with a broadcast that contains "remote control size" advertisements and thus may be distributed to the remote control device 106 in connection with the content being broadcast, which may also include advertisements for display on the client 104. In an implementation, the advertisements 148(a) may also be targeted to address functionality of the respective devices, e.g., resolution, static vs. moving, color palettes, input functionality (e.g., touch screen versus buttons) and so on.

Generally, any of the functions described herein can be implemented using software, firmware, hardware (e.g., fixed-logic circuitry), manual processing, or a combination of these implementations. The terms "module", "functionality" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques described herein are platform-independent, meaning that the techniques may be implemented on a variety of commercial computing platforms having a variety of processors.

Example Procedures

The following discussion describes advertising techniques that may be implemented utilizing the previously described environment, systems, user interfaces and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200, 300 of FIGS. 2 and 3, respectively.

Figure 4:
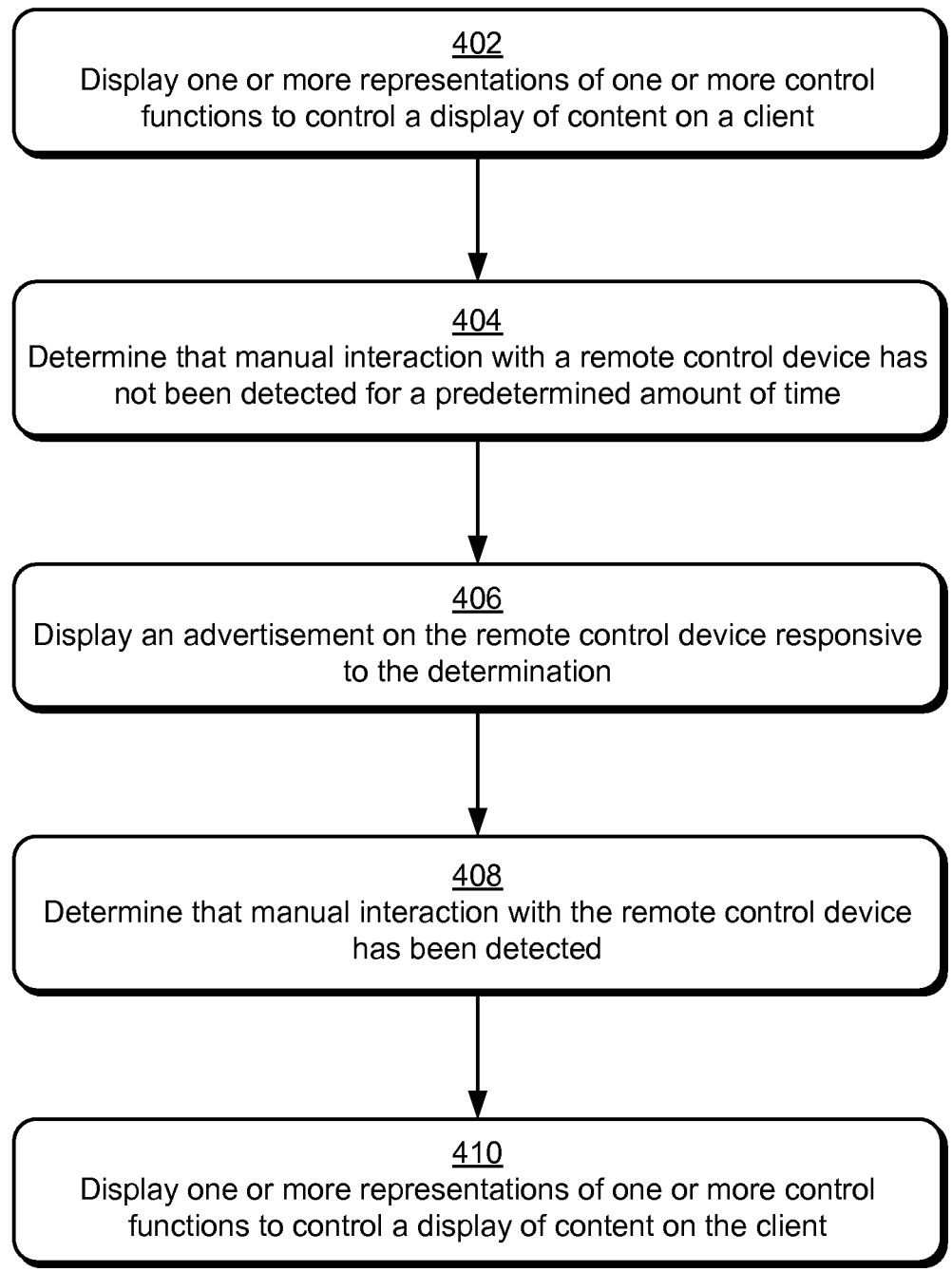
FIG. 4 is a flow diagram depicting a procedure in an example implementation in which an advertisement is displayed on a remote control device when manual interaction has not been detected for a predetermined amount of time.

FIG. 4 depicts a procedure 400 in an example implementation in which an advertisement is displayed on a remote control device when manual interaction has not been detected for a predetermined amount of time. One or more representations are displayed of one or more control functions to control a display of content on a client (block 402). As shown in FIG. 2, for instance, the representations 202 may be displayed on a touch screen of a display device of the remote control 106. Each of the representations is selectable, alone or in combination, to initiate a control function, such as to control a volume level, change channels, and so on.

A determination is made that manual interaction with a remote control device has not been detected for a predetermined amount of time (block 404). The manual interaction detection module 132, for instance, may determine that the remote control device 106 has not been moved, a button has not been pressed, and so on for the predetermined amount of time, e.g., five seconds. As previously described, the manual interaction detection module 132 may employ a wide variety of sensors to detect manual interaction directly. The manual interaction detection module 132 may also detect manual interaction indirectly upon receipt of an input from a user, e.g., pressing a button on the remote control device 106.

An advertisement is displayed on the remote control device responsive to the determination (block 406). When manual interaction is not detected by the manual interaction detection module 132 for the predetermined amount of time, for instance, the mode selection module 134 may initiate the advertisement mode 138, an example of which is shown in FIG. 3.

The remote control device 106 of FIG. 3 includes a display of an advertisement 302 on a display device of the remote control device 106. As previously described, the advertisement 302 may be coordinated with an output of content by the client 104. For example, the network operator 102, through execution of the ad module 140, may "know" what content is being output by the client 104, such as which television programs, advertisements, and so on. By leveraging this knowledge, the ad module 140 may stream relevant advertisements to the remote control device 106, either directly or indirectly through the client 104. In other words, the advertisements displayed by the remote control device 106 may correspond to content output by the client 104. In other implementations, however, the advertisements output by the client 104 do not correspond to advertisements displayed by the remote control device 106.

A determination may then be made that manual interaction with the remote control device has been detected (block 408). The manual interaction detection module 132, for example, may detect movement of the remote control device 106, may detect an input resulting from a press of a button on the remote control device 106, and so on. Responsive to the determination of manual interaction, one or more representations of one or more control functions are displayed to control a display of content on the client (block 410). For example, the mode selection module 134 may initiate the control function mode 136 such that the representations 202 of the control functions of FIG. 2 replace the display of the advertisement 302 of FIG. 3. A variety of other examples are also contemplated, such as through concurrent display of representations of control functions and advertisements.

Figure 5:
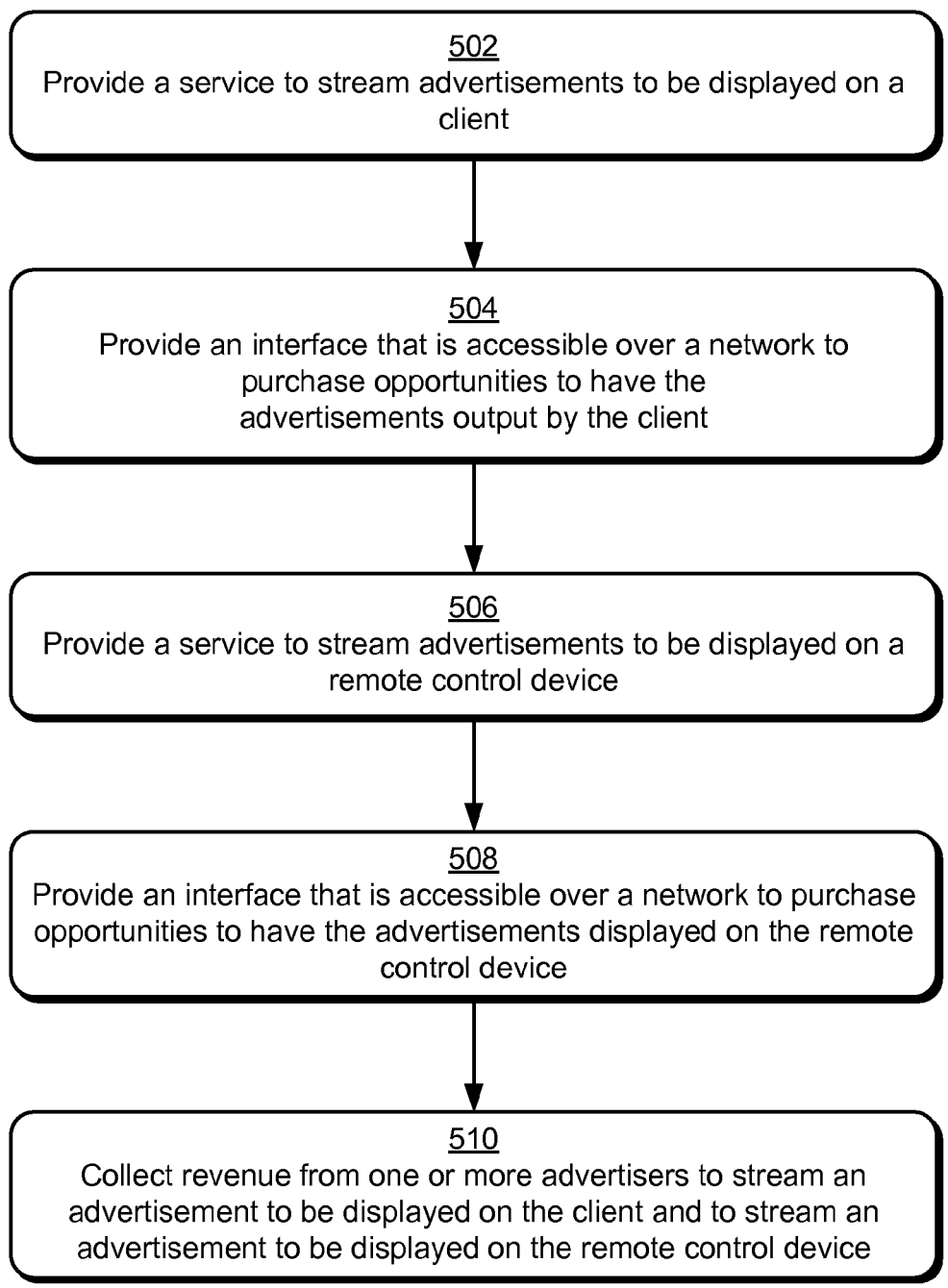
FIG. 5 is a flow diagram depicting a procedure in an example implementation in which a service is provided to stream advertisements to be displayed on a remote control device and to collect revenue for the streaming.

FIG. 5 depicts a procedure 500 in an example implementation in which a service is provided to stream advertisements to be displayed on a remote control device and to collect revenue for the streaming. A service is provided to stream advertisements to be output by a client (block 502). The service, for instance, may be provided by a network operator 102 through execution of the ad module 140 to stream advertisements 148(a) received from the advertiser 146 over the network connection 112 to the client 104. The client 104 may then output the advertisement 148(a) for display and rendering by the client 104 directly (e.g., when configured as a television) or indirectly (e.g., when the client 104 is configured as a set-top box that is communicatively coupled to a display device).

An interface is provided that is accessible over a network to purchase opportunities to have the advertisements output by the client (block 504). Continuing with the previous instance, the ad module 140 may provide an ad interface 142 that is accessible by the advertiser 146 via a network. The ad interface 142 may detail opportunities to have advertisements 148(a) output, such as at particular points in a "break" or "pod". Each of the opportunities may be assigned different prices depending on perceived value. A variety of other implementations are also contemplated, such as to provide an auction to bid for particular opportunities.

A service is also provided to stream advertisements to be displayed on a remote control device (block 506). As before, the service may also provide an interface that is accessible over a network to purchase opportunities to have the advertisements displayed on the remote control device (block 508). The advertisements 148(a), for instance, may be configured specifically for display by the remote control device 106 (e.g., as a remote control advertisement 152), such as for a limited display area, as a static image to conserve resources, and so on.

Revenue is collected from one or more advertisers to stream an advertisement to be displayed on the television and to stream an advertisement to be displayed on the remote control device (block 510). Collecting the revenue, for instance, may involve calculating a fee by the ad module 140 (e.g., based on the techniques used to provide the opportunities such as auction and so on) and sending a bill that includes the fee to the advertiser 146. Funds in payment of the fee may then be accepted by the network operator 102, such as through a financial institution to a bank account of the network operator 102. A wide variety of other examples of revenue collection are also contemplated.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   determining, by one or more module a remote control device, that manual interaction with the remote control device has not been detected for a predetermined amount of time, the remote control device comprising a touch screen configured to display representations of one or more control functions that are configured to control output of content on a client;
   responsive to the determining, displaying an advertisement on the remote control device by replacing a display of at least one of the representations of the one or more control functions displayed on the touch screen with the advertisement;
   detecting, by the one or more modules, movement of the remote control device after the advertisement is displayed; and
   responsive to the detecting of the movement, displaying the at least one of the representations of the one or more control functions that was previously replaced by the advertisement by replacing at least a portion of the advertisement on the touch screen with the at least one of the representations of the one or more control functions, the at least one of the representations of the one or more control functions being configured to
   control a function of the client that is independent of the advertisement.

2. A method as described in claim 1, wherein:
   the advertisement is selected based on the content that is currently being displayed on the client;
   the one or more control functions include volume up, volume down, channel up and channel down; and
   the content is a television program.

3. A method as described in claim 1, wherein the advertisement is not selected based on content that is currently being displayed on the client.

4. A method as described in claim 1, wherein the advertisement is selected based on content that is currently available via a channel that is different than a channel currently being used by the client.

5. A method as described in claim 1, wherein the manual interaction with the remote control device is movement of the remote control device.

6. A method as described in claim 1, wherein the manual interaction with the remote control device is the one or more control functions having not been initiated by the remote control device.

7. A method as described in claim 1, wherein the displaying is performed during an output of content on the client that is not an advertisement.

8. A method as described in claim 1, further comprising displaying the representations of the one or more control functions when an advertisement is displayed on the client.

9. A remote control device comprising:
   a display device; and
   one or more modules included in the remote control device, the one or more modules configured to:
   determine that manual interaction with the remote control device has not been detected for a predetermined amount of time, the remote control device comprising a touch screen configured to display representations of one or more control functions that are configured to control output of content on a client;

responsive to the determining, display an advertisement on the remote control device by replacing a display of at least one of the representations of the one or more control functions displayed on the touch screen with the advertisement;

detect movement of the remote control device after the advertisement is displayed; and responsive to the detecting of the movement, display the at least one of the representations of the one or more control functions that was previously replaced by the advertisement by replacing at least a portion of the advertisement on the touch screen with the at least one of the representations of the one or more control functions, the at least one of the representations of the one or more control functions being configured to control a function of the client that is independent of the advertisement.

10. A remote control device as described in claim 9, wherein:

the one or more representations are displayable and selectable using the touch screen to initiate the one or more control functions, respectively.

11. A remote control device as described in claim 9, wherein the display device consumes more than 40% of an outer surface of the remote control device.

12. A remote control device as described in claim 9, wherein the advertisement and the one or more remote control functions are not displayable on the display device simultaneously.

13. An apparatus comprising:

a memory storing processor-executable instructions; and a processor operatively coupled to the memory, wherein upon execution of the processor-executable instructions, the processor to:

determine, by one or more modules included in a remote control device, that manual interaction with the remote control device has not been detected for a predetermined amount of time, the remote control device having one or more control functions configured to control output of content on a client, the remote control device comprising a touch screen configured to display one or more representations of the one or more control functions;

responsive to the determining, displaying an advertisement on the remote control device by replacing a display of one or more of the representations of the one or more control functions displayed on the touch screen with the advertisement;

detect, by the one or more modules, movement of the remote control device after the advertisement is displayed; and responsive to the detection of the movement, replace at least a portion of the advertisement on the touch screen by displaying one or more of the representations of the one or more control functions that were previously replaced by the advertisement, the one or more of the representations of the one or more control functions being configured to control one or more functions of the client that are independent of the advertisement.

14. An apparatus as described in claim 13, wherein the advertisement is selected based on the content that is currently being displayed on the client.

15. An apparatus as described in claim 13, wherein the manual interaction with the control device is movement of the remote control device.

16. An apparatus as described in claim 13, wherein the manual interaction with the control device is the one or more control functions having not been initiated by the remote control device.

* * * * *